Figure 1:
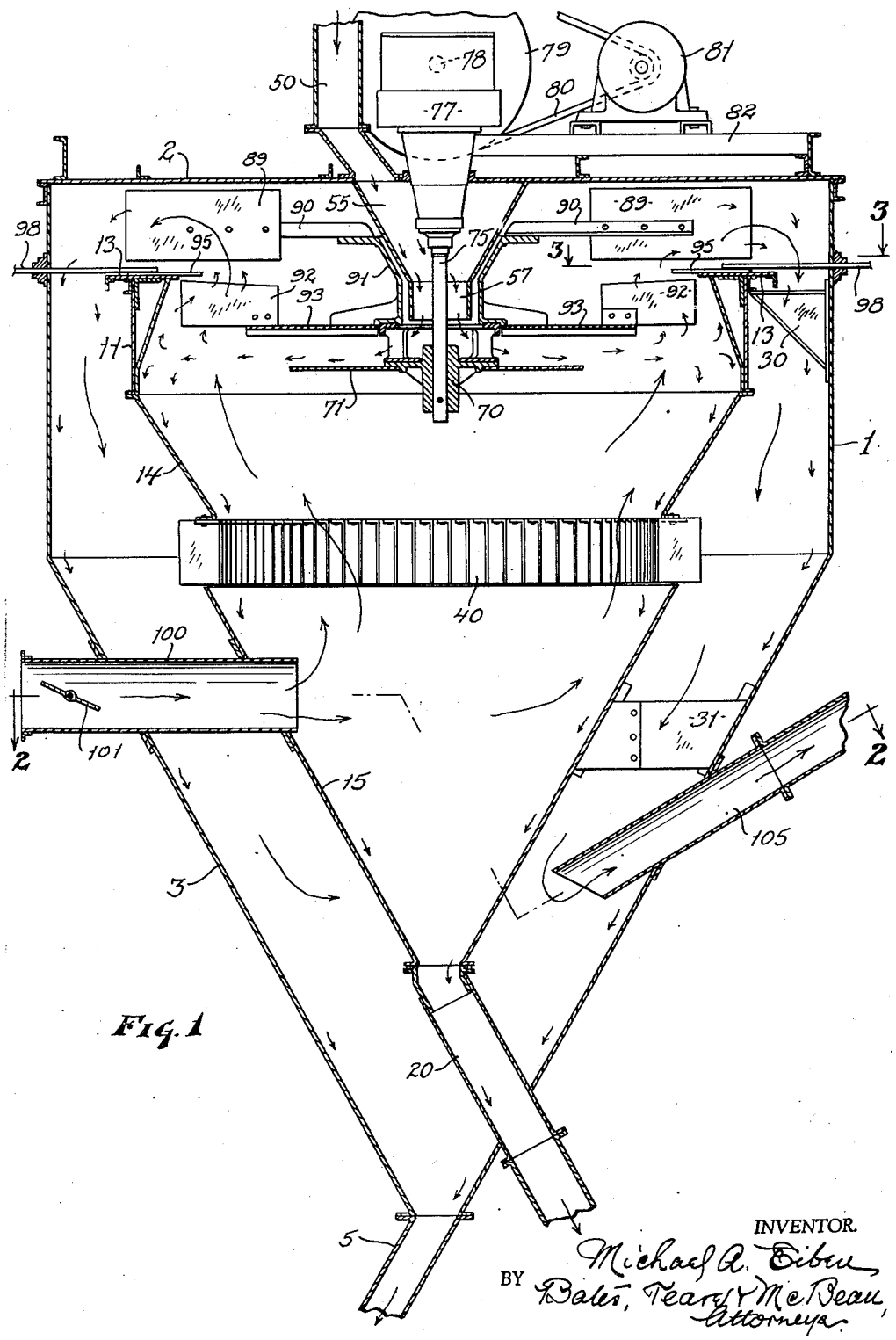

June 6, 1944. M. A. EIBEN 2,350,737
APPARATUS FOR TREATING CEMENT
Filed April 1, 1942  2 Sheets-Sheet 1

INVENTOR.
Michael A. Eiben
BY Bates, Teare & McBean
Attorneys.

June 6, 1944.   M. A. EIBEN   2,350,737
APPARATUS FOR TREATING CEMENT
Filed April 1, 1942   2 Sheets-Sheet 2

INVENTOR.
Michael A. Eiben
BY Bates, Teare & McBean
Attorneys

Patented June 6, 1944

2,350,737

UNITED STATES PATENT OFFICE 2,350,737

APPARATUS FOR TREATING CEMENT

Michael A. Eiben, Cleveland, Ohio

Application April 1, 1942, Serial No. 437,181

3 Claims. (Cl. 209—139)

This invention relates to a system of reducing cement aggregate to the requisite fineness of the particles without incurring excessive heat in the product. The invention is especially concerned with the air separator employed in separating the "fines" from the coarser particles, which later are returned to the grinding element for re-grinding, after which they are again passed through the separator.

One of the objects of the invention is to enable the production of a larger proportion of fines, thus increasing the efficiency and speed of operation. Another object is to reduce excessive heat in the product in the separator, so that the cement may be produced cool enough for storage or immediate use. Another object is to avoid the expenses and other disadvantages attendant on cooling the cement by the application of water to the apparatus.

One of the difficulties of handling cement during the separating operation thereof, to reduce the clinker gradually to correct fineness, has been the fact that the cement has acquired a temperature frequently in excess of 300° Fahrenheit. At that temperature it cannot be readily stored, for the interior portion would remain hot a long time, nor can it be immediately used, as the excessive evaporation of water in the mix would spoil the concrete being formed. There is also great danger of causing burns to the workman handling the hot sacks.

The foregoing objections to hot cement are so acute that in some places laws have been passed forbidding the shipment of cement from the mill with a temperature in excess of 125°. To meet this situation manufacturers have spent large sums of money to cool the cement by the application of cooling water to machines and conduits handling the cement. Sometimes expensive water jackets have been employed, but usually the apparatus has been sprayed with water. The latter is cheaper, but water impinging on the hot shells of the machines and conduits is converted into vapor or steam, which, rising through the building, condenses on the cement dust and forms a troublesome incrustation on the walls of the building and on the machinery.

In obtaining the fine cement it is customary to employ a device known as an air separator. This device receives the unsorted aggregate and causes it to be thrown across the path of a moving current of air and separated into different degrees of fineness, the finer material constituting the finished product and the coarser being sent back to the mill for further grinding.

Heretofore air separators have operated on what may be termed a closed circuit system, in that the air set in motion by the fan within the separator causes the dust-laden air to circulate locally within the container itself. This air becomes gradually hotter and hotter as the operation progresses. Moreover, the air picking up the fine dust in the separator adds it to the coarse material brought to the separator, with the result that a large percentage of the fine material is mixed with the coarser material and goes into the reject conduit and is carried back to the grinding mill.

In my method, I depart entirely from the closed circuit system in the separator; on the contrary, I bring in clean, outside air which passes continually upwardly through the material being thrown out by the fan and thence passes outwardly with fine material as dust to a dust collector. I thus avoid passing the fines as dust through the incoming material and temporarily losing them as rejects, as in the old system. Accordingly, with my air separator I greatly increase the proportion of fines and reduce the proportion of rejects which are delivered. An additional advantage of this is that rejects may be more readily ground into fine material than if encumbered in the grinding mill with fines delivered from separator.

A further advantage of great importance in my system is that the cool air coming in from the outside, and continually passing through the separator, maintains the separator and its contents cool, so that the delivered fines are ready for immediate use or storage. This avoids all of the disadvantages consequent upon water cooling.

My invention includes the method of treating the cement, by subjecting it to external air during the separation, as above outlined, and includes also the apparatus for carrying out such operation. A preferred form of this apparatus is illustrated in the drawings hereof and will hereinafter be described in detail.

Figure 2:
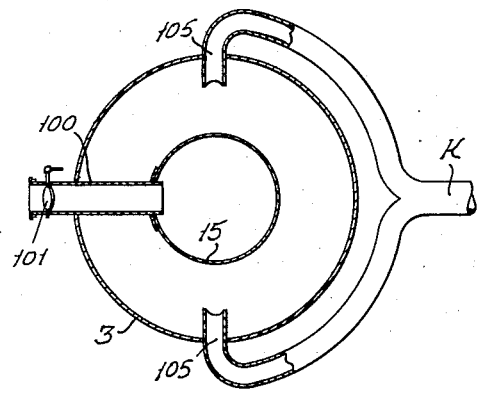
Figure 3:
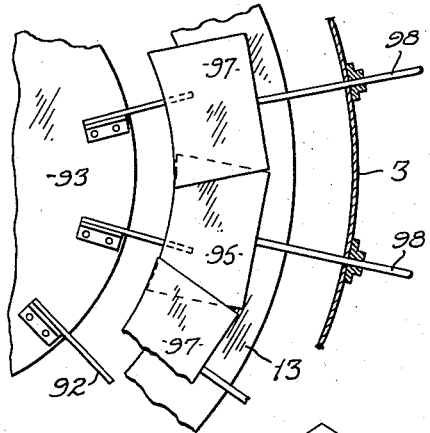
Figure 4:
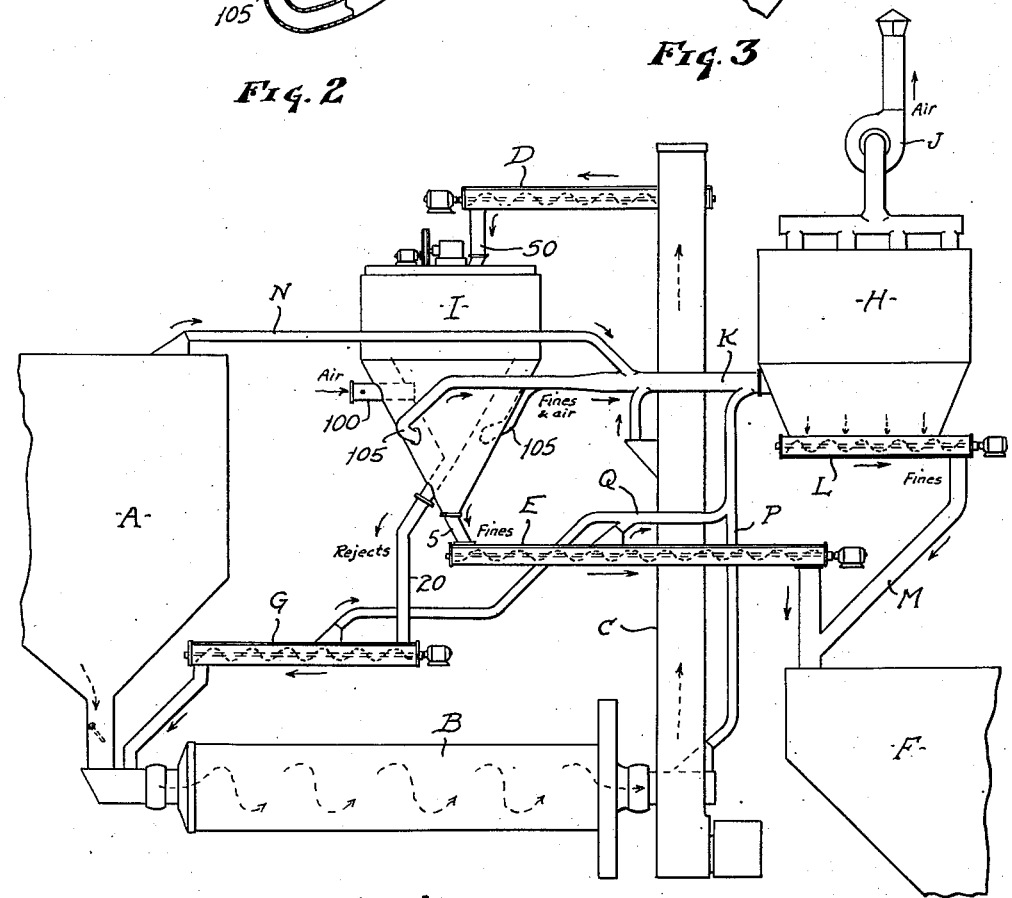

In the drawings Fig. 1 is a vertical axial section of the separator with the air discharge pipe displaced horizontally 90° for simplicity of illustration; Fig. 2 is a substantially horizontal section on the offset line indicated by 2—2 in Fig. 1, showing the air discharge pipes in preferred position, but on smaller scale; Fig. 3 is a fragmentary horizontal section on the line 3—3 of Fig. 1; Fig. 4 is a diagram in elevation of a cement plant using my separator.

Fig. 1 shows a separator having many of the characteristics of the usual type, being converted from the usual closed construction, which re-circulates the same air, to the outside air system of this invention. I will first describe the features of the separator shown which are common to the old and new systems, as follows:

The separator shown comprises an outer casing which includes a cylindrical drum 1 having a cover 2 and a cone 3 projecting down from the drum, and terminating in a discharge spout 5 for the finished product. Within and spaced from the outer casing is an inner casing consisting of a drum 11 having a ring 13 at the top thereof, leaving a central opening into the drum, and an annular opening into the space between the two drums. Extending downward from the drum 11 is a frusto-conical portion 14 and beneath the latter is a cone 15 provided with a tailing discharge spout 20 entering through the lower portion of the cone 3 of the outer casing.

The inner casing 14, 15 is supported by the outer casing by brackets carried by the latter, one of these brackets appearing at 30 in Fig. 1. This view also shows a brace 31 between the cones 3 and 15.

The cones 14 and 15 are shown as connected by an annular member 40 having approximately tangential vanes. In the usual practice these vanes are adjustable to different angular positions to vary the velocity of the air currents passing through them, but in my invention the vanes employed may be omitted as desired.

The space within the inner casing drum 11 and the frusto-conical portion 14 constitutes a separating chamber, while the annular space between the inner and outer casings constitutes a receiving or settling chamber. To introduce the materials to be graded into the separating chamber, a feed spout 50 is provided on the cover 2 and communicates with a chute 55 projecting down through the opening within the ring 13. This chute has a neck 57 extending a substantial distance into the separating chamber.

The materials passing down through the chute 55 are delivered to a rotary distributor, in the present instance comprising a hub 70 and a lower circular plate 71. The base is secured to the lower end of a vertical shaft 75 which projects up through the chute 55 and beyond the cover. The shaft is journalled in a casing 77 mounted on the cover. The shaft is connected, for instance, by bevel gearing (not shown) with a transverse shaft 78 mounted in the casing and shown as having a pulley 79. This pulley is indicated as connected by a belt 80 to a pulley on the armature shaft of the motor 81 mounted on a frame 82 at the top of the separator.

Located above the opening in the ring 13 is a fan 89 comprising blades secured on arms 90 mounted on and secured to the upper flange of a hub 91 surrounding the feed neck 57 and connected to the base 70. This rotating base is shown as carrying also a fan beneath the opening through the ring 13, this fan comprising blades 92 on a circular plate 93.

The fans described give a whirling motion to the air within the separating chamber throwing such air outwardly so that a current is established upwardly adjacent the inner surface of the cone 14 and drum 11 and thence outwardly and downwardly between the inner and outer cones. In the old construction such current turns inwardly at the vane ring 40 and thence upwardly, thus causing local re-circulation of the same air in the upper region of the separator.

It may be desirable to vary the effective opening from the fan chamber into the space between the outer and inner casing and for this purpose the valve construction illustrated in Fig. 3 may be employed. This valve comprises a series of lower plates or sections 95 resting on the top ring 13 of the inner casing and a series of upper plate sections 97 superimposed on plates 95. These various sections are preferably of oblong shape. Each plate has a rod 98 secured thereto extending outwardly through the outer casing. By means of these rods the plates may be shoved inwardly or pulled outwardly to vary the effective opening inside of the ring 13.

It results from the construction which I have so far described that centrifugal force causes the lighter particles of the cement to travel with the air over the ring 13 and downwardly between the inner and outer drums and be finally discharged as fines through the spout 5, while gravity acting on the heavy particles prevents their being lifted by the air over the ring 13, so that they impinge against the inner wall of the drum 11 and slide downwardly within the inner cone construction and are discharged as rejects through the spout 20.

In such closed construction it inevitably happens that the re-circulating air carries a quantity of fines up through the stream of rejects so that the rejects discharged include a large percentage of fines. Time and expense is wasted in passing such fines with the coarser rejects back through the grinding mill for re-grinding.

It is also a result of the closed air system, as heretofore mentioned, that the air becomes hotter and hotter as the operation proceeds, thus augmenting the extent of previous cooling necessary, with its attendant disadvantages as already noted. All of these disadvantages are avoided and much expense saved by the changes I have made in the construction and operation of the separator, which will now be described.

I place one or more intake tubes, designated 100 in Figs. 1 and 2, in such position that they extend across the passageway between the outer and inner cones and thus carry outside air to the interior of the inner cone 15. These tubes are open-ended but are preferably controlled by an internal damper 101. From the space between the two cones I lead one or more outlet tubes 105 which preferably extend diagonally upward. I prefer to use two of these discharge tubes 105, as indicated in Fig. 2, though for convenience of illustration only one is shown in Fig. 1.

There are several advantageous results in the conversion from the closed circuit to what may be called an open circuit system. The fans cause cool outside air to come in through the passageway and pass upwardly to the top of the machine and thence downwardly between the two cones, where such air is discharged through the passageways 105. This maintains the contents comparatively cool.

Now this upward current of air is clean air so that when it traverses the mixed portions of material which include rejects, it does not bring fines with it, as in the closed system, with the results that the percentage of fines in the rejects discharged is very much reduced. My experience indicates that by employing this outside air instead of having perhaps 35% of the material discharged as fines and 65% as rejects, on the average, I am able to reverse this proportion and obtain an average of 65% of fines and 35% of rejects. In some operations I have greatly exceeded this efficiency.

My outside air system so effectively prevents excessive heat in the separator that no cooling water need be employed, and nevertheless the material may be continually discharged at a temperature not exceeding the specified maximum of 125° Fahrenheit. Accordingly, my system produces much larger quantity of fines and fines at a temperature ready for use.

In the diagram, Fig. 4, I have indicated a cement plant employing my system of separation. In this diagram, A indicates the clinker bin receiving the cement material to be treated and rendered ready for use. B indicates a suitable grinding mill receiving material from the clinker bin. C indicates an elevator receiving the material from the grinding mill and discharging it to a screw conveyor D which carries the material to the receiving spout 50 of the separator I. In Fig. 4, E indicates a screw conveyor receiving the fines from the separator conveying them to the receiving bin F. G indicates a screw conveyor receiving the rejects from the separator and conveying them to the entrance end of the grinding mill B. Thus the rejects are reground with the fresh material coming from the conveyor bin, and pass up to the elevator, and are again passed through the separator.

In the diagram, H indicates a dust collector connected with a discharge fan J. The discharge pipes 105 from the separator are shown as leading into a conduit K which is connected to the dust collector. The discharge from the dust collector will be fines, and these fines accumulating at the bottom of the collector are transferred by a screw conveyor L to a conduit M which leads down to the receiving bin F.

The fan J of the dust collector, acts as a booster for the air travel caused by the fans in the separator. Thus the cool clean air entering through the tube 100 passes to the inner cone; thence, upwardly through the incoming material; thence downwardly between the cones, and outwardly via the conduits 105 and K into the dust collector, and thence out through the fan J to the final discharge.

I prefer to provide conduits leading from the various parts of the complete apparatus to the conduit K and thus collect fines in the form of dust wherever available leading to the dust collector. Thus a conduit N may lead from the top of the clinker bin to the conduit K. A conduit P may lead from the elevator to the conduit K. The conduit Q may lead from the screw conveyors G and E to the dust collector, this conduit being indicated as merging with the conduit K.

In such a complete installation as indicated in Fig. 4, the rough material is ground and separated, and the fines are taken not only from the separator but from every available point to the dust collector where they pass to the receiving bin. I thus obtain a larger percentage of fines, than heretofore possible, and, as heretofore stated, the entrance of outside air into the separator maintains the separator cool without the use of outside cooling provisions and their attendant disadvantage.

I claim:

1. In an apparatus of the character described, the combination of two casings one within the other and spaced therefrom to leave an annular space between them, separate discharge conduits from the respective casings, an open tubular conduit extending from the outside across the annular space between the casings into the inner casing and adapted to deliver outside air, a rotary distributing member in the upper portion of the apparatus and means for feeding material into the central region of such upper portion, whereby the material may be thrown outwardly and the heavier materials descend on the inner wall of the inner casing, means for moving the air entering through the open passageway from the outside to cause it to pass upwardly across the stream of outwardly moving materials and then with the entrained lighter materials to pass downwardly into the annular space between the two casings, a discharge conduit for dust-laden air leading from the space between the casings, and a dust collector with which the discharge conduit communicates.

2. In a separator, the combination of an outer casing having a cone with its apex at the bottom and a drum above the cone, an inner casing composed of a drum and cone spaced from the drum and cone of the outer casing and leaving an annular space between them, spouts for the "fines" and "rejects" connected respectively to the bottom of the outer and inner cones, an intake conduit in communication with the atmosphere leading from the outside across the annular space to the interior of the inner cone, a discharge conduit for air leading from the space between the cones and connected to a dust collector, a rotary fan and material distributer in the upper portion of the apparatus, and means to deliver rough material centrally to the distributing device whereby the same is thrown outwardly against the wall of the inner drum, said fan maintaining a current of air from the intake upwardly across the outwardly flowing course of material, thence downwardly in the annular space between the drums and cones and thence outwardly into the air-discharge conduit.

3. In a separator, the combination of an outer casing having a cone with its apex at the bottom, an inner casing having a cone with its apex at the bottom, the inner casing being spaced from the outer casing and being disposed substantially concentrically thereof, spouts for the "fines" and "rejects" connected respectively to the bottom of the outer and inner cones, an intake conduit in communication with the atmosphere and extending from the outside across the space between the two cones and to the interior of the inner cone at a point above the apex thereof, a discharge conduit for air leading from the space between the cones and extending through the outer casing at a point above the apex thereof, means outside the casing for imparting suction to the discharge conduit, a rotary distributing member in the upper portion of said separator, means for feeding material into the central region of such upper portion whereby the material may be thrown outwardly and the heavier materials descend on the interior wall of the inner casing, a rotary fan mounted in the upper portion of said separator, said fan operating in conjunction with said suction-forming means to maintain a current of air into the inner casing through said intake conduit, upwardly across the outwardly flowing course of material, thence downwardly into the space between said cones, and outwardly into said air discharge conduit.

MICHAEL A. EIBEN.